United States Patent [19]

Kimura

[11] Patent Number: 4,956,872

[45] Date of Patent: Sep. 11, 1990

[54] IMAGE PROCESSING APPARATUS CAPABLE OF RANDOM MOSAIC AND/OR OIL-PAINTING-LIKE PROCESSING

[75] Inventor: Hiroyuki Kimura, Yokohama, Japan

[73] Assignee: Canon Kabushiki Kaisha, Tokyo, Japan

[21] Appl. No.: 113,997

[22] Filed: Oct. 29, 1987

[30] Foreign Application Priority Data

Oct. 31, 1986 [JP] Japan ............................ 61-258605
Oct. 31, 1986 [JP] Japan ............................ 61-258606
Oct. 31, 1986 [JP] Japan ............................ 61-258607

[51] Int. Cl.$^5$ ............................................ G06K 9/36
[52] U.S. Cl. .................................... 382/44; 382/45; 382/48; 358/22; 358/75; 358/183
[58] Field of Search ................ 382/44, 45, 48, 41; 358/22, 75, 183

[56] References Cited

U.S. PATENT DOCUMENTS

| | | | |
|---|---|---|---|
| 4,240,112 | 12/1980 | Inabb et al. | 358/22 |
| 4,334,245 | 6/1982 | Michael | 358/183 |
| 4,345,313 | 8/1982 | Knox | 358/75 |
| 4,602,286 | 7/1986 | Keller et al. | 358/22 |
| 4,669,054 | 5/1987 | Schlunt et al. | 382/42 |
| 4,689,682 | 8/1987 | Jackson | 358/183 |
| 4,720,871 | 1/1988 | Chambers | 382/41 |
| 4,729,029 | 3/1988 | Henri et al. | 358/183 |
| 4,782,388 | 11/1988 | Lake | 358/22 |

FOREIGN PATENT DOCUMENTS

0046370 4/1981 Japan ................................ 358/22

Primary Examiner—Leo H. Boudreau
Assistant Examiner—Yon Jung
Attorney, Agent, or Firm—Fitzpatrick, Cella, Harper & Scinto

[57] ABSTRACT

An image processing apparatus in which a pixel of first image data is designated, a predetermined pattern is generated on first image data in accordance with the position of the designated pixel, the coordinates of each pixel in the predetermined pattern are transformed to this coordinate values of the predetermined pixel, and image information for the pixels of the first image data is, e.g., given the value of the designated pixel.

12 Claims, 11 Drawing Sheets

IMAGE PROCESSING APPARATUS CAPABLE OF RANDOM MOSAIC AND/OR OIL-PAINTING-LIKE PROCESSING

BACKGROUND OF THE INVENTION

1. Field of the Invention

This invention relates to an image processing apparatus which transforms an original image by generating a pattern having a predetermined form at a random position on the original image.

2. Related Background Art

There have been developed various devices and methods in various fields of digital image processing. A natural image such as a photograph may be input as digital image data and subjected to processing such as, for example, density conversion, gradation conversion, mosaic processing, and cutting-and-synthesizing processing to produce a creative image. One of those methods is to perform processes such as uniform density conversion, uniform gradation conversion, and uniform mosaic processing on the entire picture. In this case, the operator does not need to input or follow any special instructions, since the entire picture repeats the same pattern, and no modulations or variations are used; which results in a relatively an uninteresting image.

Another method is to designate a part of a picture using an image position input means such as a digitizer or a random number generating means and to perform density conversion, color conversion, and cutting-and-synthesizing processing, etc., only on a part of the image so designated. This produces an image which contains a processed portion and an unprocessed portion, so that the image has a modulation. Another processing on the once processed image would produce various patterns, to thereby produce a very creative image.

However, these methods take much time because random numbers are generated or executed by the operator's designation of the image position. Furthermore, when random designation is performed using a random number, patterns are formed at discrete positions, so that one pattern may be superposed on another one already formed, namely, processing may be performed twice or more on the same pixel, which takes excess time. In order to store the coordinates of pixels designated randomly by random numbers, a large capacity of memory is required, especially for storing image data of high resolution.

The applicant has proposed mosaic processing in U.S. Patent Application Ser. No. 007,785 filed Jan. 28, 1987.

SUMMARY OF THE INVENTION

It is an object of this invention to provide an image processing apparatus which solves the above problems and which is capable of transforming an image into a creative image.

It is another object of this invention to provide an image processing apparatus which is capable of transforming image data at high speeds using a coordinate transforming method which transforms the coordinate values of an original image on the basis of coordinate values of a processed image.

In order to achieve the above objects, an image processing apparatus according to one aspect of this invention, comprises:

means for designating a pixel of first image data;

means for generating a predetermined pattern on the first image data;

means for transforming the coordinates of a pixel of the first image data, in the predetermined pattern to coincide with the coordinate values of the predetermined pixel; and means for processing image information of each pixel of the first image data to produce a pixel of second image data having the coordinate values corresponding to the pixel of the first image data in accordance with the result of the operation by the transforming means.

In the above arrangement, a predetermined pattern is generated on the first image by the generating means on the first image on the basis of the designated pixel of the first image data. The coordinates of a pixel in the predetermined pattern are transformed into the coordinate values of the predetermined pixel. Second image data is formed by processing the image information of the pixels of the first image data as having coordinate values corresponding to those of the pixel of the first image data on the basis of the result of the transformation.

It is a further object of this invention to provide an image processing apparatus which is capable of transforming image data using a smaller capacity of memory by storing such transformation information using the difference between the coordinate value of a pixel of the processed and the original images.

In order to achieve the above object, an image processing apparatus according to another aspect of this invention, comprises:

means for designating a pixel of first image data;

means for generating a predetermined pattern on the first image data in accordance with the designated pixel;

means for storing transforming information, which transforms the coordinates of a pixel in the predetermined pattern to the coordinate values of the predetermined pixel in the predetermined pattern, as representing a difference between the transformation information and the coordinate value of a pixel of the first image data; and means for transforming the first image data to second image data in accordance with the transforming information.

In the above arrangement, a predetermined pattern is generated on a first image using the generating means on the basis of the designated pixel of the first image data. The transforming information which transforms the coordinates of a pixel in the predetermined pattern to the coordinate values of a predetermined pixel in the predetermined pattern is stored as the difference between the transforming information and the coordinate value of a pixel of the first image data The first image data is transformed to second image data in accordance with the transforming information.

An image processing apparatus according to a further aspect of this invention is capable of setting an image area wider than the original image area, and determining image data to be processed in the wide image data to set various processed areas for the same image data. The apparatus comprises, means for setting an area wider than the area for the first image data;

means for determining the position of the first image data within the wider area; and means for processing information on the first image data in accordance with the position of the image data.

In the above arrangement, the position of the first image data is determined within the area wider than that of the first image data. Image information on the first image data is processed in accordance with the coordinates of the determined position of the first image data.

Other objects, features and advantages of this invention will be more fully apparent from the following detailed description of the preferred embodiments, taken with reference to the accompanying drawings.

BRIEF DESCRIPTION OF THE DRAWINGS

FIG. 11, consisting of FIGS. 11A and 11B, is a flowchart for the oil painting-like processing in FIG. 9.

DETAILED DESCRIPTION OF THE PREFERRED EMBODIMENT

The preferred embodiments of this invention will now be described in detail with reference to the drawings.

(structure of an Image Processing Apparatus (FIG. 1))

Figure 1:
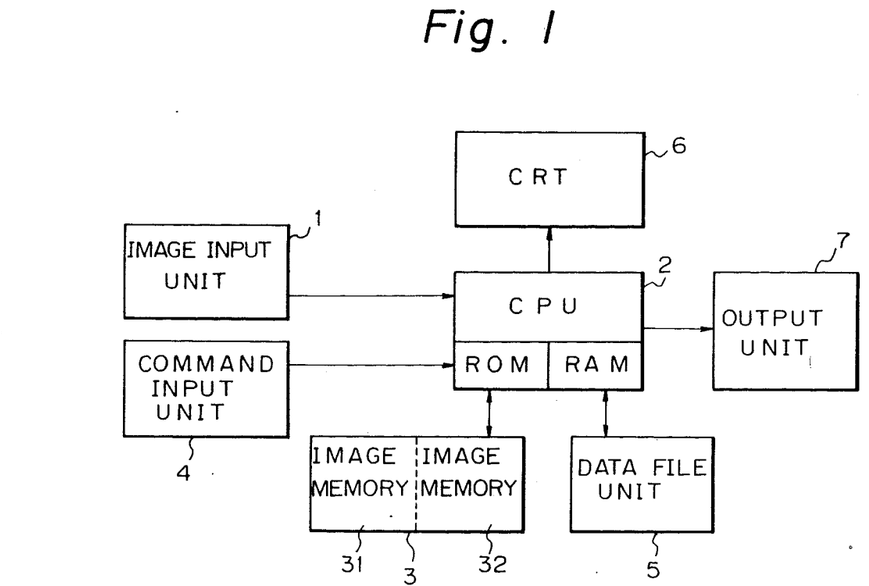
FIG. 1 is a schematic of an image processing apparatus of this embodiment.

FIG. 1 is a schematic of an image processing apparatus of this embodiment. In FIG. 1, an image input unit 1 such as a TV camera or a drum scanner photoelectrically reads an original image on a photographic film or a printed image, converts the read analog signal to a digital singal and inputs the latter signal to a CPU 2. CPU 2 controls the entire apparatus and includes a ROM for storing a control program shown by the flowcharts of FIG. 2 and other subsequent Figures and data and a RAM as a work area. An image storage 3 includes an image memory 31 which stores original image data from the image input unit 1 and an image memory 32 which stores processed image data which has been subjected to various image processing to be described later.

A command input unit 4 includes, for example, a keyboard or a digitizer for inputting various image processing commands to CPU 2. When the command input unit includes a keyboard, commands are given by pressing command keys corresponding to respective processing operation, while when the command input unit is a digitizer, a command is given by designating a selection on a menu disposed on a digitizer board or on a CRT screen using a cursor or the like. A data file unit 5 stores coordinate transformation files corresponding to various image processing commands.

A CRT 6 displays image data in the image memory 3 or a menu for inputting commands. CPU 2 reads a coordinate transformation file from the data file 5 in accordance with a processing command from the command input unit 4, performs required processing on original-image data in the image memory 31 and stores the results in the image memory 32. The image data thus obtained is printed by an output unit 7 including a printer or a film recorder.

(Mosaic Processing (FIGS. 2-4))

Figure 2:
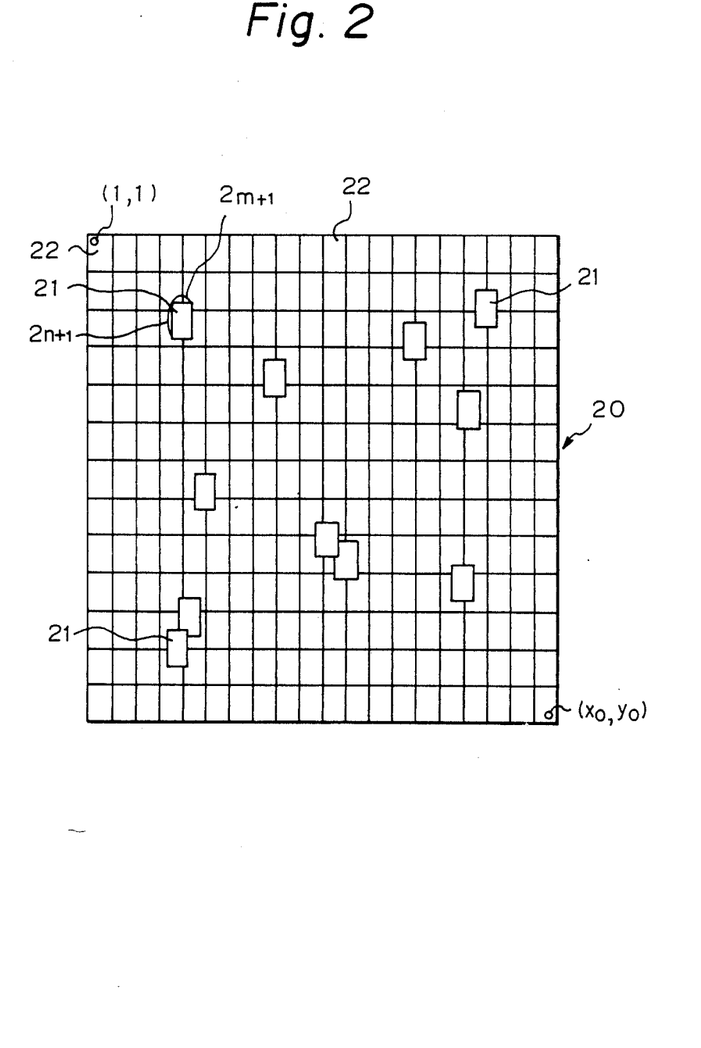
FIG. 2 is illustrates a concept of mosaic processing.

FIG. 2 shows one example of an image subjected to mosaic processing.

An image 20 is obtained by mosaic processing of an original image (not shown) constituted by $x_0$ horizontal and $y_0$ vertical pixels divided into equal blocks or mosaics 22. The coordinates of the left upper corner are (1,1) and the coordinates of the right lower corner are $(x_0, y_0)$. Mosaics 21, unlike mosaics 22, are disposed randomly in the image 20, each having a size $(2m+1)$ pixels wide x $(2n+1)$ pixels long, where m and n are positive integers.

Figure 3:
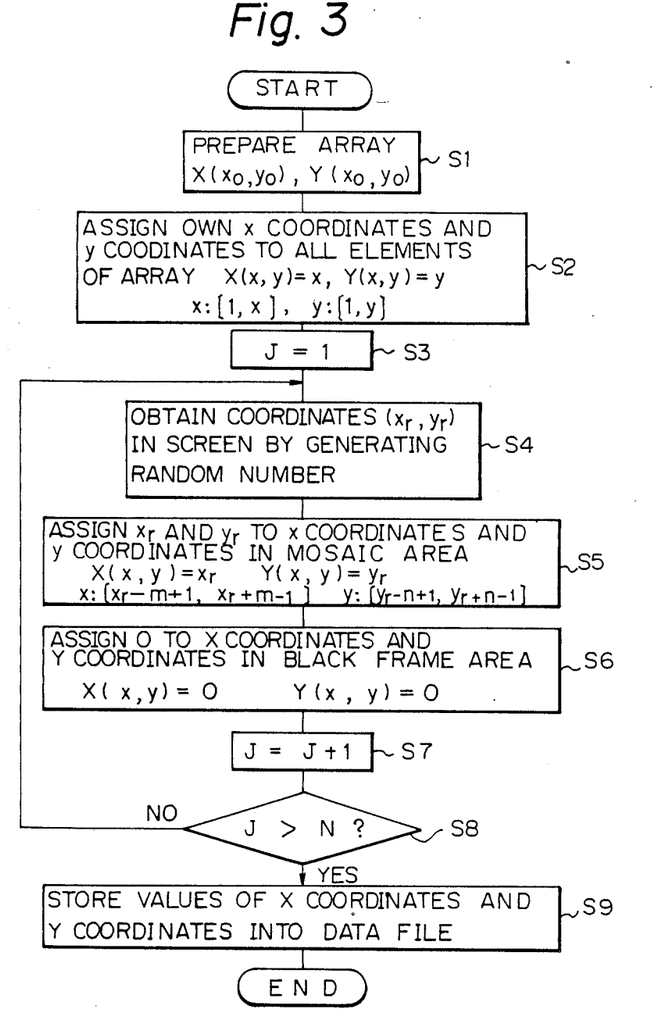
FIG. 3 is a flowchart for forming a coordinate transforming file for mosaic processing.

FIG. 3 is a flowchart for forming a coordinate transforming file for mosaic processing stored in the data file unit 5.

At step S1 an array $X (x_0, y_0)$, $Y (x_0, y_0)$ for storing X and Y transformed coordinates corresponding to a respective one of the pixels of the original image is prepared in the RAM in CPU 2.

At step S2, coordinate values corresponding to the coordinate values (x,y) of the original image are assigned to the respective elements $X (x, y)$, $Y (x, y)$ of the array. Thus the array element $X(x, y) = X$, $Y (x, y) = y$ where $1 \leq x \leq x_0$, $1 \leq y \leq y_0$. The coordinate values of all the elements are set in advance in this fashion since there is a good probability that a given pixel is coordinates will not be transformed at all to the last even if mosaics 21 are produced using random numbers or the like.

A shift is then made to step S3, where a counter J which counts the number of mosaics 21 is set to "1". At step S4, a random number is generated to produce the central coordinates $(x_r, y_r)$ of mosaic 21 in the coordinates of the original picture, where $1 \leq x_r \leq x_0$, $1 \leq y_r \leq y_0$. At step S5 the central coordinates $(x_r, y_r)$ are assigned to the array elements (X, Y) of all the pixels in the area of the mosaic, the center of which has the central coordinates $(x_r, y_r)$. The picture elements having coordinate values in the range of $x_r - m + 1$ to $x_r + m - 1$, $y_r - n + 1$ to $y_r + n - 1$ based on the size of the mosaic 21 fall within the mosaic area.

A shift is then made to step S6, where 0 is assigned to the X and Y coordinates of elements constituting a black frame area of the mosaic 21. The black frame area is a rectangular one defined by the coordinates $(x_r - m, y_r - n$ to $y_r + n)$, $(x_r + m, y_r - n$ to $y_r + n)$, $(x_r - m$ to $xr + m, y_r - n)$, $(x_r - m$ to $x_r + m, y_r + n)$.

It is provided to give a firm impression to the entire image. The values showing the black frame area are not necessarily required to be 0, but may be any value, outside the picture area. Of course, at least one of X and Y coordinates may be transformed to a value outside the picture area so as to designate the black frame area.

At step S7 the counter J which counts mosaics 21 is incremented by +1 and at step S8 it is checked whether the counter operation has repeated N times, where N is the number of mosaics 21. If the number of mosaics 21 so processed is not yet N, a return is made to step S4, where the aforementioned operations are repeated. When the number of mosaics 21 processed reaches N, a shift is made to step S9, where the values of X and Y coordinates ((X,Y) array-element values) of the respective picture elements are stored in the data file 5, and the processing ends.

Figure 4:
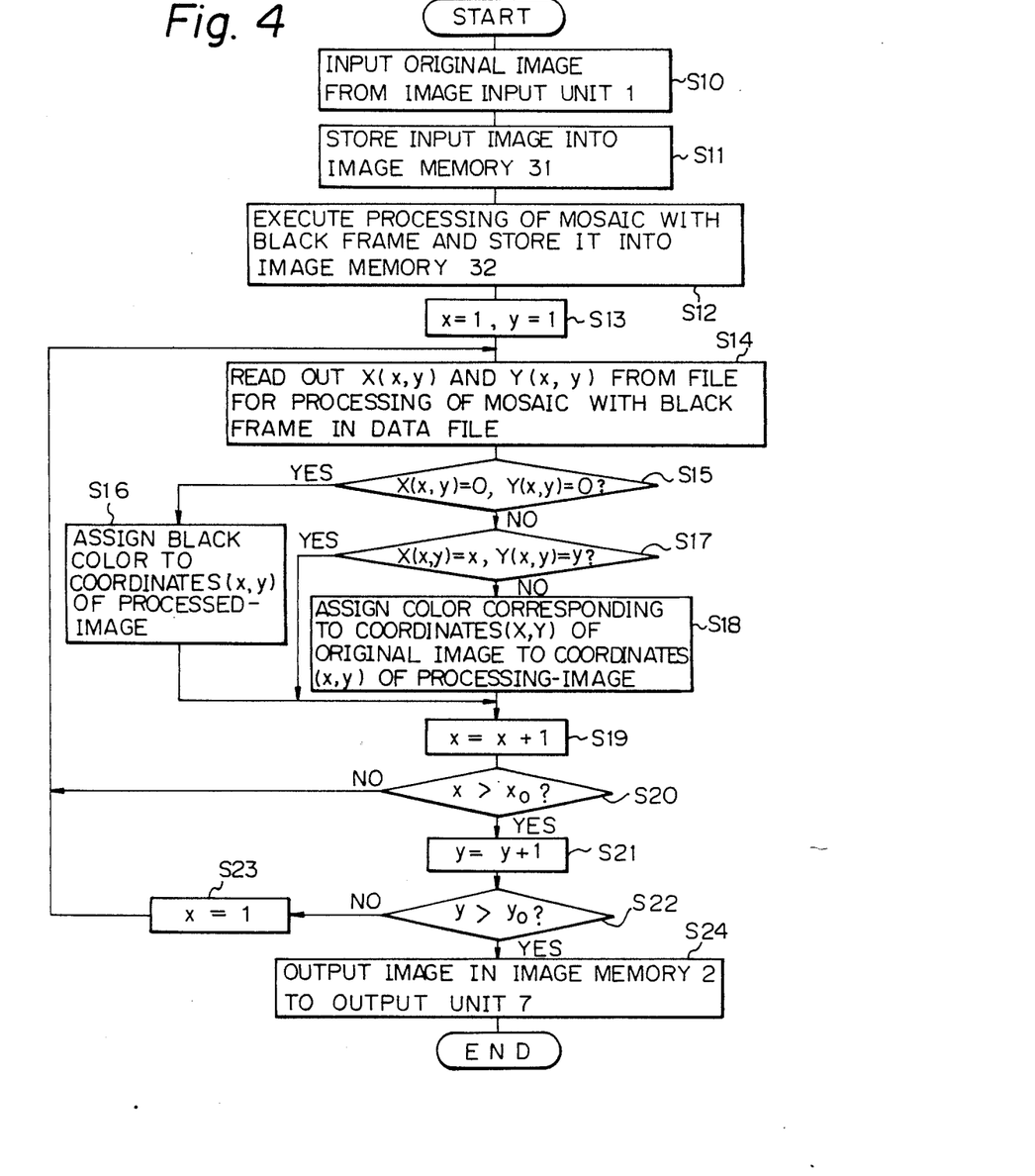
FIG. 4 is a flowchart for mosaic processing.

FIG. 4 is a flowchart for mosaic processing in this embodiment.

First, at step S10 digital original image data is input from the image input unit 1. At step S11 the original image data is stored in the image memory 31. At step S12 mosaic processing which involves forming a black frame having a size of 2m+1 pixels wide x 2r+1 pixels long on the entire picture is executed and the result is stored in the image memory 32. In more detail, the mosaic processing includes dividing the original image into rectangular mosaics 22, as shown in FIG. 2, coloring the mosaics each with a uniform color throughout the mosaic and changing the boundary pixels present between the respective mosaics 22 into black color.

Thereafter, at steps S14–S22, random mosaics 21 are generated.

At step S13 X- and Y-direction coordinate counter are both set to 1. At step S14 transformed coordinate values are read out from the data file 5 formed on the basis of the flowchart of FIG. 3. At step S15 it is checked whether at least one of X (x, y) and Y (x, y) of the array is 0, namely, in the boundary area. If the pixel in question is in the boundary area, a shift is made to step S16, where black color is assigned to the corresponding coordinates in the image memory 32. If it is not in the boundary area, a shift is made to step S17, where it is checked whether the transformed coordinate values in the data file 5 are equal to the original coordinate values, namely, whether X (x, y) =x and Y (x, y) =y. If the transformed-coordinate values are equal to the original coordinate values, namely, the coordinates are not transformed, a shift is made to step S19 without performing any processing. Otherwise, a shift is made to step S18, where the color of the corresponding coordinates (X, Y) of the original image in the image memory 31 is assigned to the coordinates (x, y) in the image memory 32.

At steps S19 and S20 it is checked whether pixels for one entire line in the x direction have been checked. If the pixels for one line have been checked, a shift is made to step S21, where a one-line shift is made in the y direction, and the next line is checked. When processing for one picture ends, the processed image data is stored in the image memory 32, and at step S24 the image data in the image memory 32 is output to the output unit 7 and the processing ends.

As just described, preparation in advance of a coordinate transformation file in the data file 5 allows sequential processing of pixels, and identical processing of several original images, to thereby achieve high speed processing compared to the method in which the steps of generating each coordinate value randomly using a corresponding random number and processing the periphery of a pixel corresponding to the coordinate value are repeated.

(Oil Painting-like Processing (FIGS. 5–8))

Figure 5:
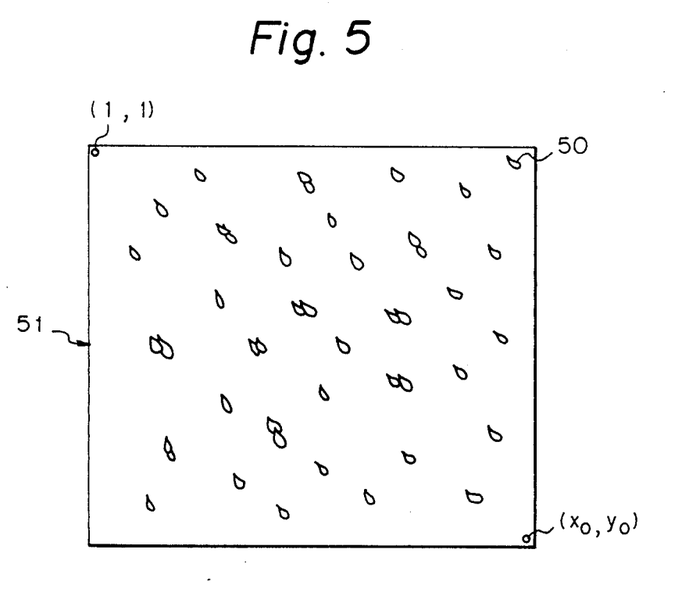
FIG. 5 illustrates a concept of oil-painting-like processing.

FIG. 5 shows another example of disposing blocks 50 showing brush touches at random positions on the original image.

Figure 6:
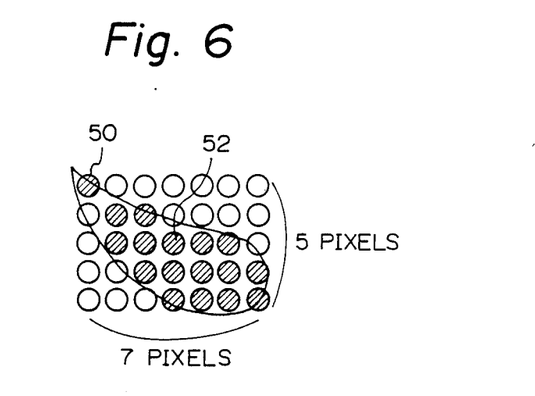
FIG. 6 shows the form of brush touch.

The original image 51 is constituted by $x_0$ horizontal and $y_0$ vertical pixel positions with the left upper end coordinates being (1, 1) and the right lower end coordinates being $(x_0, y_0)$. Each block or brush-stroke-shaped area 50 of a brush touch is constituted by 7 horizontal and 5 vertical pixel positions, as shown in FIG. 6. N such blocks are disposed at random positions on the original image to process a natural image as if it were oil-painted.

Figure 7:
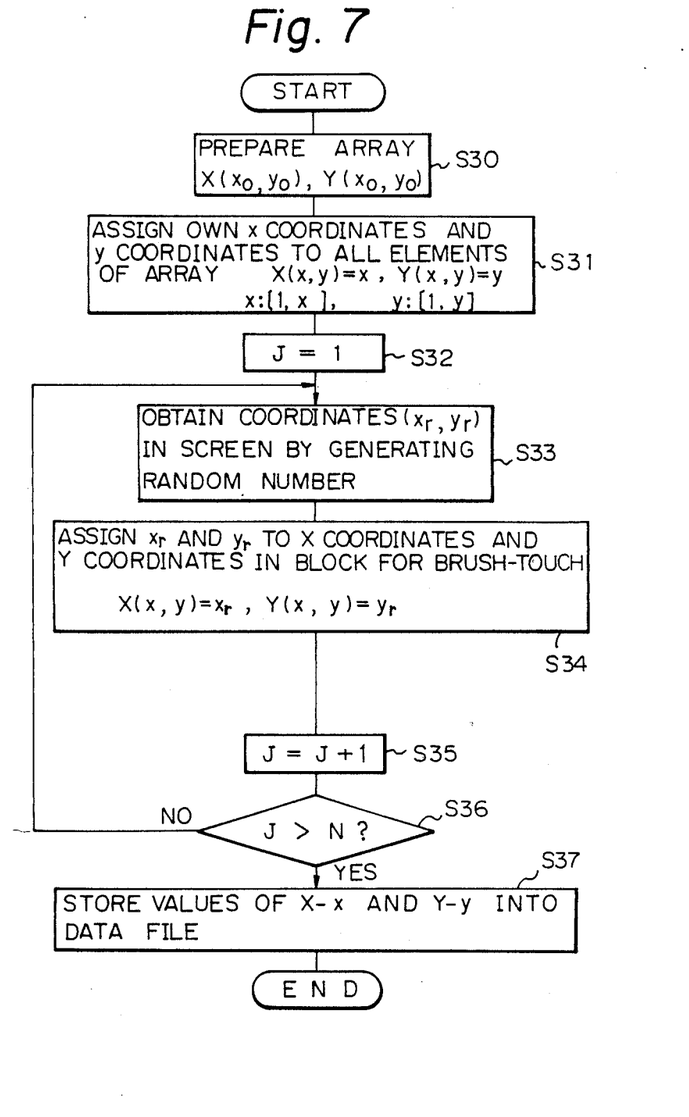
FIG. 7 is a flowchart for forming a coordinate transformation file for oil-painting-like processing.

FIG. 7 is a flowchart for forming a coordinate transformation file for oil painting-like processing stored in the data file 5.

As in the flowchart of FIG. 3, at steps S30–S32 an array $X(x_0, y_0)$, $Y(x_0, y_0)$ is prepared, the coordinate values $(1 - x_0, 1 - y_0)$ of the original image 51 being assigned to all the elements of the array. At step S33 a random number is generated to obtain the coordinates $(x_r, y_r)$ of the center 52 of a block 50 in the coordinates of the original image 51. At step S34 the values of all the coordinates $(X_r, y_r)$ of the pixels corresponding to the block 50 are assigned $(X_r, y_r)$. Namely, the X and Y coordinates of pixels present in the block 50 in the range of $x_r-3 \leq x \leq x_r+3$ and $y_r-2 \leq y \leq y_r+2$ are all assigned the value $(x_r, y_r)$.

FIG. 7 differs mainly from FIG. 3 in that in the case of oil-painting-like processing, there is no area surrounded by a black frame (or boundary area), so that FIG. 7 has no processing corresponding to the step S6 of FIG. 3.

When N blocks 50 have been formed on the image, a shift is made to step S32, where the respective differences between X, Y coordinates and the coordinate values x, y of the pixel, i.e., the values X - x, and Y - y, are stored. This is because, if the values of X and Y coordinates, having values 1 to $x_0$ and 1 to $y_0$, respectively, were stored, a data area satisfying $x_0$ and $y_0$ for each element is needed, requiring many memories.

As in this embodiment, however, if the difference between the coordinate values in the data area is obtained and stored, the coordinate values will fall within a range of $-3$ to $+3$ for X - x and $-2$ to $+2$ for Y - y because the difference values need only be enough to cover the sizes of a brush touch. Thus the data area is small to thereby save the required memory capacity greatly.

Figure 8:
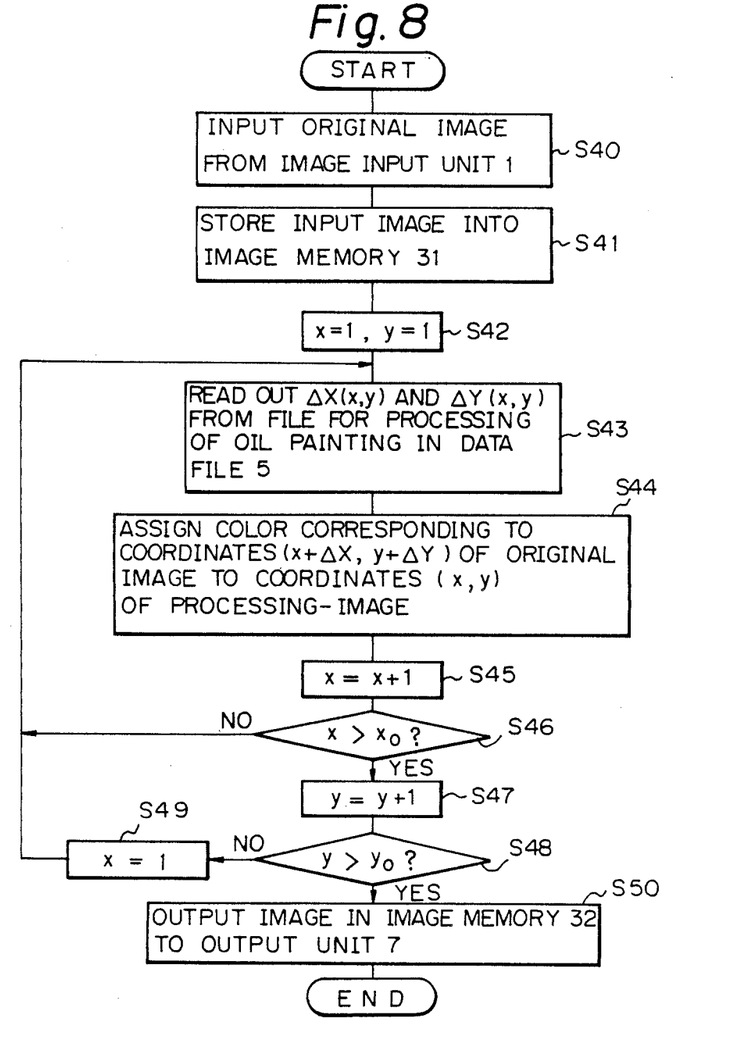
FIG. 8 is a flowchart for oil-painting-like processing.

FIG. 8 is a flowchart for oil-painting-like processing using a coordinate transformation file of another embodiment. It is basically the same as the flowchart of the FIG. 4 and differs mainly from FIG. 4 in that the coordinate values are stored as differential values in the coordinate transformation file, no black frame areas are provided, and the original image is not required to be processed and stored in advance in the image memory 32 because brush touches are added on the original image in oil-painting-like processing.

Since steps S40–S42 are similar to the steps S10–S13 of FIG. 4, further description will be omitted. Thus description will be started with step S43. At step S43 respective X and Y differential coordinates, $\Delta X$, $\Delta Y$ are read out from the data file 5. At step S44 the of the original image in the image memory 31 is stored at the coordinates (x, y) of the image memory 32. In this way, when all the pixels of one picture, $1 \leq x \leq x_0$ and $1 \leq y \leq y_0$, are arranged in the image memory 32, a shift is made to step S50, where the processed image in the image memory 32 is output to the output unit 7 and the processing ends.

In this way, if the differential values on the X and Y coordinates are stored in the data file 5, the required capacity of the memory required of the data file will be greatly reduced. If the processing involving provision of a black frame is desired, values outside those required for the shape of brush touches are stored in advance in the data file (for example, $-3$ is assigned to the Y coordinate in FIG. 6) and change to black color may be performed in accordance with those values at the processing.

(Example in Which the Data Area for the Coordinate Conversion File is Larger than the Processed Image Area (FIGS. 9–11))

Figure 9:
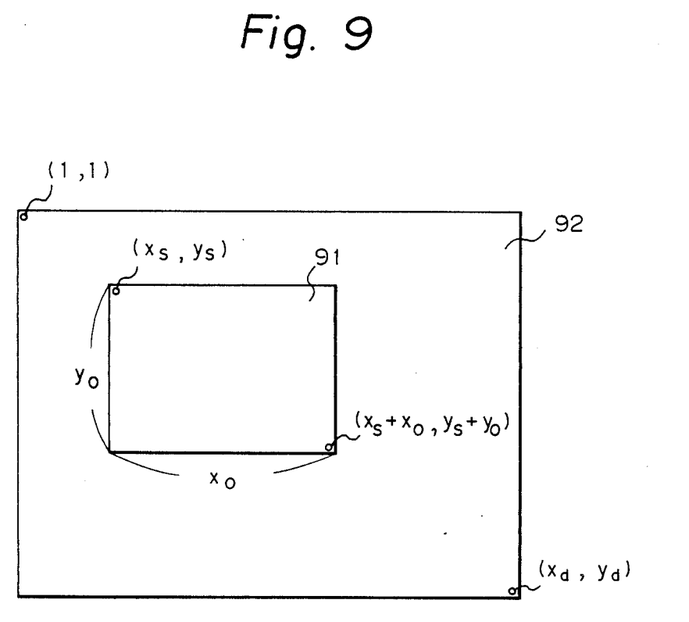
FIG. 9 shows a concept in which the coordinate transformation file is large compared to a processed image area.

FIG. 9 shows the relationship between processed image area 91 and data area 92. The processed image area 91 is constituted by $x_0$ horizontal and $y_0$ vertical pixels, as in the previous embodiment. It is movable within the data area 92 relative to the left upper end coordinates $(x_s, y_s)$. The data area 92 is the one in the coordinate transformation file having an area $1 \leq x \leq x_d$, $1 \leq y \leq y_d$ where $x_d > x_0$, $y_d > y_0$, larger than the processed image area 91.

Figure 10:
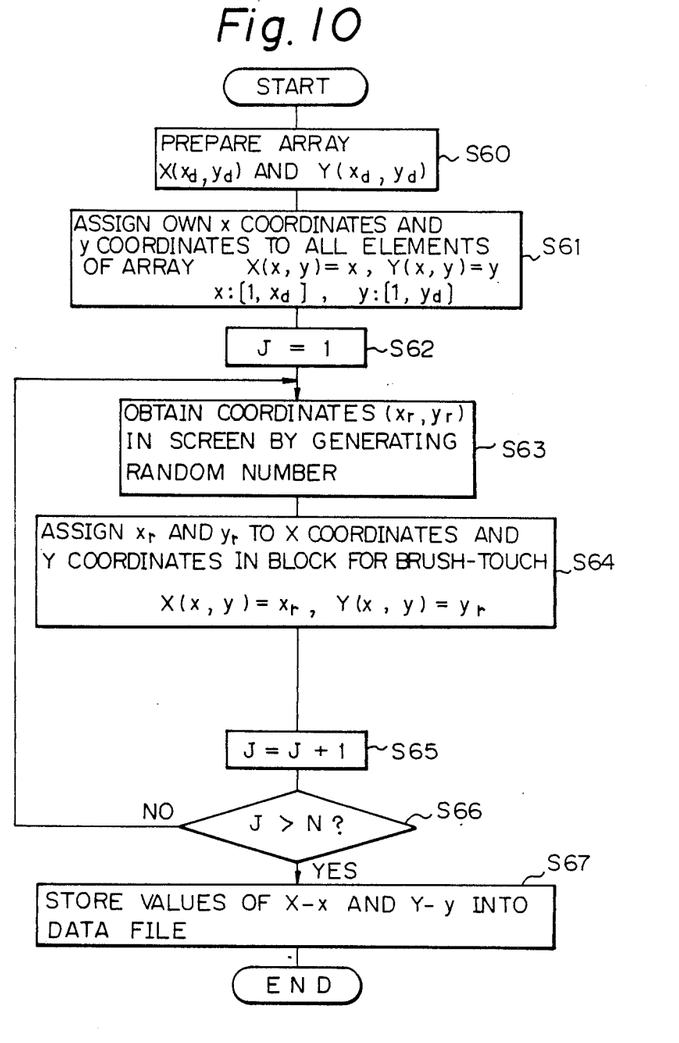
FIG. 10 is a flowchart for forming the coordinate transformation file in FIG. 9.

FIG. 10 a flowchart of another embodiment which forms a coordinate transformation file having the range of the data area 92 in the data file 5. This flowchart is the same as that of FIG. 7 except for the dimensions of the array X, Y, and further description will be omitted.

Figures 11, 11A:
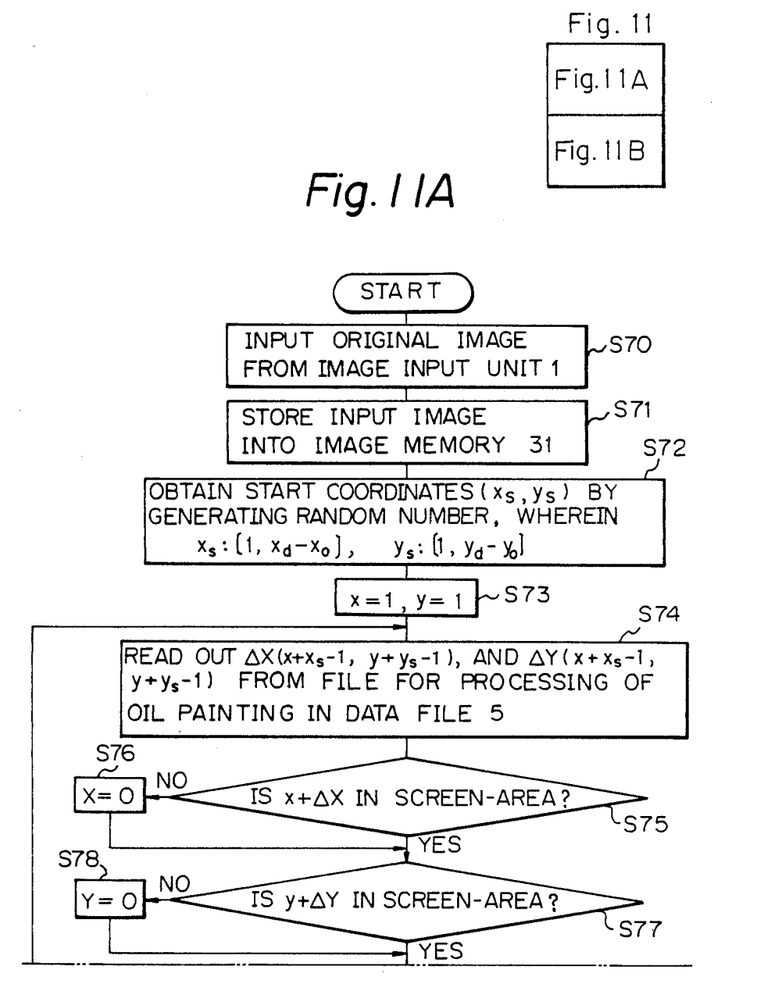
Figure 11B:
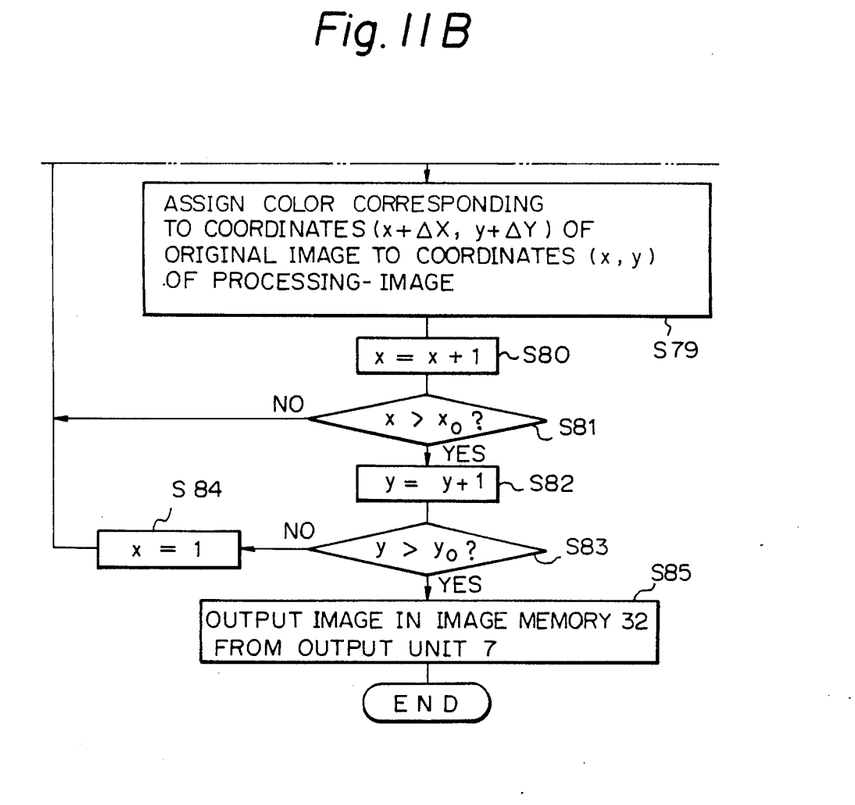

FIG. 11 is a flowchart for oil-painting-like processing in a further embodiment, in which a coordinate transformation file having a data area larger than the processed image area is stored in the data file 5.

At steps S70 and S71 the original image is stored in the image memory 31 from the image input unit 1. At step S72 a random number is generated to obtain the start coordinate $(x_s, y_s)$ of the coordinate transformation file, where, of course, $1 \leq x_s \leq x_d - x_0$ and $1 \leq y_s \leq y_d - y_0$. At step S73 both the x- and y-direction counters are set to 1. At step S74 the differential values $\Delta X$ $(x+x_s-1, y+y_s-1)$, $\Delta Y$ $(x+x_s1, y+y_s-1)$, are read out from the coordinate transformation file in the data file. Therefore, first the differential data corresponding to the coordinates $(x_s, y_s)$ of the original image are initially read out. At steps S75 and S76, it is checked whether $x + \Delta X$ and $y + \Delta Y$ are in the processed image area 91. If not, the differential data is set to be 0 at steps S76 and S78. If the poin is in area 91, a shift is made to step S79.

At step S79 the color of the coordinates $(x+\Delta X, Y+\Delta Y)$ of the original image is stored in the coordinates $(x, y)$ of the processed image. In this way, the processed images are stored sequentially in the image memory 32, and when processing on all the pixels of the original image is completed, the stored image is output to the output unit 7 at step S85, and the processing ends.

As just described, if the coordinate transformation file of the data file unit 5 is made larger than the processed image area and processing is performed while changing the positions on the image area randomly, different results would be obtained even if the processing is performed using the same coordinate transformation file, to thereby create variations in the processing results. When processing is performed using this method, the values of $x+\Delta X$ and $y+\Delta Y$ may be outside the processed image area, in which case $\Delta X$ and $\Delta Y$ are set to 0 at steps S76 and S78 to shift to the next corresponding processing.

As described above, according to the particular embodiment, the coordinate transformation file is prepared in advance, so that the processing is performed at higher speed as compared to the case in which each time a random number is generated, a corresponding form is generated.

The present embodiment has the advantage that differential coordinate values are stored as coordinate transformation file information in memory in order to reduce the required memory capacity greatly.

This embodiment has the further advantage that the data area in the coordinate transformation file is constituted larger than the processed image area, and the processed image area is selected randomly from the data area so that the image can be transformed to a different image even if the same transformation file is used, and that effective processing is possible on the edge of the original image.

As described above, according to this invention, by previous preparation of a coordinate transformation file formed using random numbers, image data can be transformed at high speeds.

Further, the capacity of the coordinate transformation file formed using random numbers can be reduced.

In addition, even if the same image data and the same transformation file are used, the image can be transformed to different images.

While this embodiment is illustrated as handling mosaic processing, this invention may, of course, be applied to color transformation, cutting-and-synthesizing processing.

This invention is not limited to the above embodiments, and various changes and modifications could be made by those skilled in the art within the scope of claims.

I claim:

1. An image processing method for converting image data of a plurality of pixels in a predetermined block into image data of a representative pixel in the predetermined block of an original image, comprising the steps of:
   randomly designating the representative pixel;
   converting a plurality of coordinate values of a plurality of pixels in the predetermined block into a coordinate value of the representative pixel, and storing the converted coordinate value in a coordinate file;
   executing said designating step and said converting-and-storing step plural times, once for each block of the original image, to complete the coordinate file, wherein said executing step further includes the step of changing the position of the predetermined block on the basis of a position of the representative pixel randomly designated in said designating step;
   storing an original image comprising image data of a plurality of pixels; and
   converting image data of each pixel of the original image into image data of a pixel in the same block and corresponding to the representative pixel of that block stored in said coordinate file.

2. A method according to claim 1, wherein each predetermined block is rectangular in shape, and the representative pixel is substantially at a center in the rectangular block.

3. A method according to claim 1, wherein a shape of each predetermined block represents a non-rectangular, brush-stroke-like pattern.

4. A method according to claim 1, wherein the number of pixels of the original image stored in said storing step is smaller than that of coordinate values stored in the coordinate file.

5. A method according to claim 1, wherein said converting-and-storing step further includes the step of storing a difference between a coordinate value prior to converting operation and a coordinate value after the converting operation.

6. An image processing method comprising the steps of:
    inputting an original image comprising image data of a plurality of pixels;
    randomly selecting a single pixel from among the plurality of pixels input in said inputting step;
    generating a brush pattern on the basis of image data of the pixel selected in said selecting step;
    repeatedly executing said selecting and generating steps in order to generate a plurality of brush patterns on the original image; and
    judging the number of the brush patterns generated in said generating step,
    wherein said executing step comprises finishing the repeated executing when, in said judging step, it is judged that a predetermined number of brush patterns have been generated.

7. A method according to claim 6, wherein said generating step includes the step of converting image data of a plurality of pixels which exist in the vicinity of the pixel selected in said selecting step, into image data of the selected pixel, in order to produce a brush pattern.

8. An image processing method for converting image data of a plurality of pixels in a predetermined block into image data of a representative pixel in the predetermined block of an original image, comprising the steps of:
    converting a plurality of coordinate values of a plurality of pixels in the predetermined block into a coordinate value of the representative pixel, and
    storing the converted coordinate value in a coordinate file;
    executing said converting-and-storing step plural times, once for each block of the original image, to complete the coordinate file;
    storing an original image comprising image data of a plurality of pixels; and
    converting image data of each pixel of the original image into image data of a pixel in the same block and corresponding to the representative pixel of that block stored in said coordinate file,
    wherein said converting-and-storing step further includes the step of storing a difference between a coordinate value prior to converting operation and a coordinate value after the converting operation.

9. A method according to claim 8, further comprising the step of randomly designating the representative pixel, and wherein said executing step further includes the step of changing the position of the predetermined block on the basis of a position of the representative pixel randomly designated in said designating step.

10. A method according to claim 8, wherein each predetermined block is rectangular in shape, and the representative pixel is substantially centrally located in the rectangular block.

11. A method according to claim 8, wherein each predetermined block has a shape representing a non-rectangular, brush-stroke-like pattern.

12. A method according to claim 8, wherein the number of pixels of the original image stored in said storing step is smaller than that of coordinate values stored in the coordinate file.

* * * * *

UNITED STATES PATENT AND TRADEMARK OFFICE
CERTIFICATE OF CORRECTION

PATENT NO. : 4,956,872

DATED : September 11, 1990

INVENTOR(S) : HIROYUKI KIMURA

It is certified that error appears in the above-identified patent and that said Letters Patent is hereby corrected as shown below:

ON THE TITLE PAGE,
IN [56] REFERENCES CITED

U.S. PATENT DOCUMENTS, "Inabb et al." should read --Inaba et al.-- and "Keller et al." should read --Kellar et al.--.

IN [57] ABSTRACT

Line 6, "this" should read --the--.

COLUMN 1

Line 26, "an" should be deleted.

COLUMN 2

Line 52, "data" should read --data.--.

COLUMN 3

Line 56, "operation," should read --operations,--.

COLUMN 4

Line 25, "$X(x,y) = X, Y(x,y) = y$" should read --$X(x,y) = x, Y(x,y) = y$--.
    Line 28, "pixel is" should read --pixel's--.
    Line 29, "last" should read --last,--.
    Line 68, "coordinates" should read --"coordinates"--.

UNITED STATES PATENT AND TRADEMARK OFFICE
CERTIFICATE OF CORRECTION

PATENT NO. : 4,956,872

DATED : September 11, 1990

INVENTOR(S) : HIROYUKI KIMURA

It is certified that error appears in the above-identified patent and that said Letters Patent is hereby corrected as shown below:

COLUMN 5

Line 9, "x 2r + 1 pixels" should read --x 2n + 1 pixels--.
Line 19, "step S13" should read --step S13,-- and "counter" should read --counters--.
Line 68, "pixel, positions," should read --pixel positions,--.

COLUMN 6

Line 6, "file ,5." should read --file 5.--.
Line 14, "$(X_r, y_r)$" should read --$(x_r, y_r)$--.
Line 15, "$(X_r, y_r)$" should read --$(x_r, y_r)$--.
Line 17, "$y_r 2 \leq y \leq y_r + 2$" should read --$y_r - 2 \leq y \leq y_r + 2$--.
Line 25, "step S32," should read --step S37,--.
Line 38, "small" should read --too small--.

UNITED STATES PATENT AND TRADEMARK OFFICE
CERTIFICATE OF CORRECTION

PATENT NO.  : 4,956,872

DATED       : September 11, 1990

INVENTOR(S) : HIROYUKI KIMURA

It is certified that error appears in the above-identified patent and that said Letters Patent is hereby corrected as shown below:

COLUMN 7

Line 33, "$\Delta Y(x+x_s 1, y+y_s-1)$" should read --$\Delta Y(x+x_s-1, y+y_s-1)$--.
Line 40, "poin" should read --point--.
Line 43, "$Y+\Delta Y)$" should read --$y+\Delta Y)$--.

Signed and Sealed this

Seventh Day of April, 1992

Attest:

HARRY F. MANBECK, JR.

*Attesting Officer*       *Commissioner of Patents and Trademarks*